Sept. 19, 1950 M. ARTZT 2,522,919
FACSIMILE PHASING SYSTEM
Filed Jan. 27, 1948
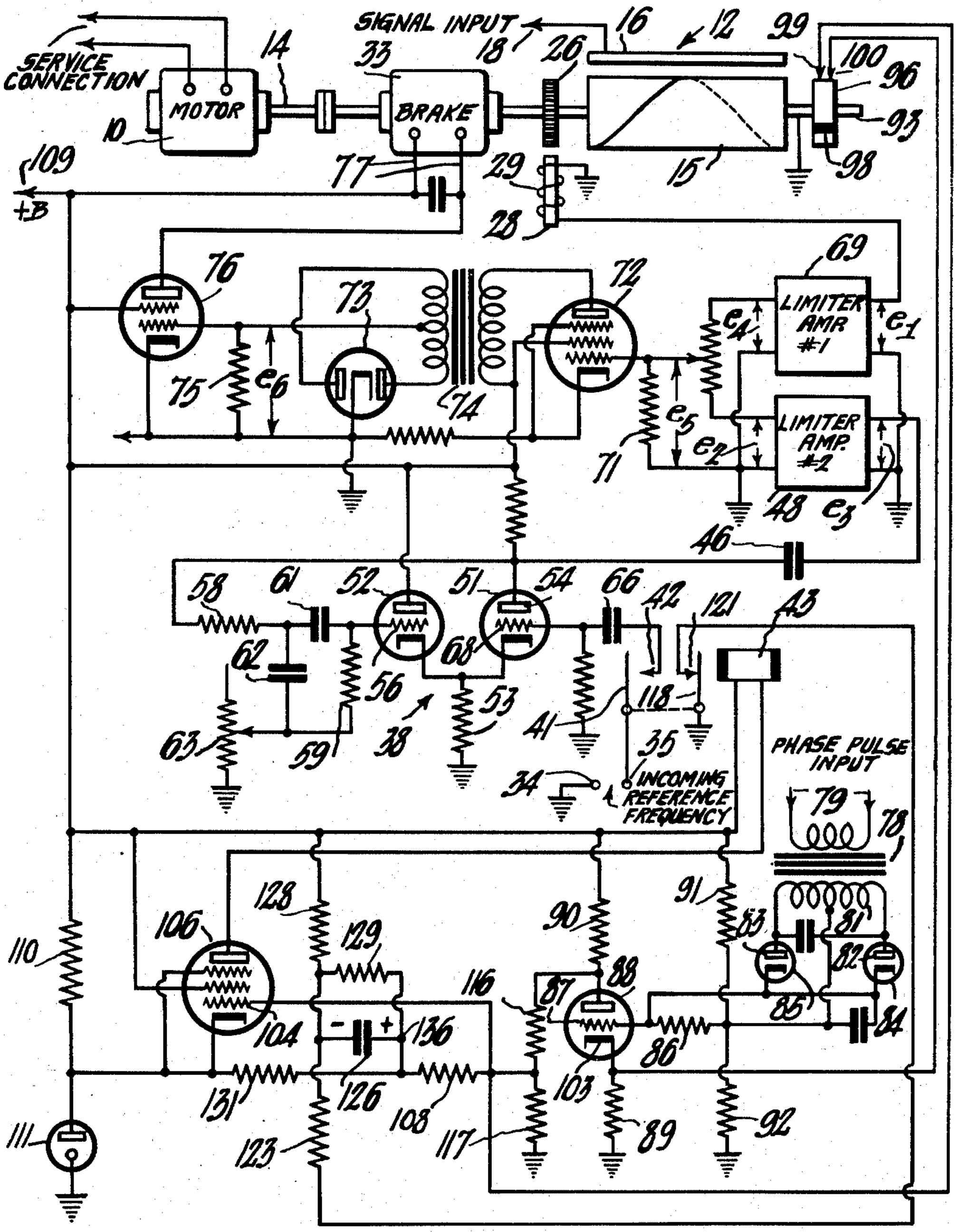
INVENTOR
Maurice Artzt
BY Olin F. Mitchell
ATTORNEY Patented Sept. 19, 1950 2,522,919

UNITED STATES PATENT OFFICE 2,522,919

FACSIMILE PHASING SYSTEM

Maurice Artzt, Princeton, N. J., assignor to Radio Corporation of America, a corporation of Delaware Application January 27, 1948, Serial No. 4,581

3 Claims. (Cl. 178—69.5)

The present invention relates to phasing apparatus and phasing circuits and, more particularly, but not necessarily exclusively, to the phasing of facsimile equipment, such, for example, as a high speed facsimile recorder.

In facsimile systems generally, a moving part of a facsimile recorder, such as one of the marking or printing elements, must operate co-phaseally with the corresponding part of the transmitter scanner. The principal aim of the present invention is to provide novel means for automatically accomplishing phasing of a moving part of the facsimile recorder with a corresponding part of a facsimile transmitter.

In accordance with the invention a prime mover, such as a driving motor for the apparatus to be phased, is caused to operate at a speed other than its normal speed until accurate phasing is obtained, whereupon this "in phase" condition is rigidly maintained. These functions are accomplished automatically.

Another object of the invention is to provide novel electronic means for performing a phasing operation in connection with the phasing of one moving part with another moving part.

A further object of the invention is to provide a novel arrangement for releasing a recorder or the like of a facsimile system from close phase relationship with a transmitter to permit rephasing.

Other objects of the invention will appear from the following description, reference being had to the accompanying drawing which shows, schematically, phasing apparatus arranged to function in accordance with the invention.

This invention constitutes an improvement of the apparatus disclosed and claimed in Patent No. 2,383,360, granted to the present inventor, August 21, 1945, and entitled Synchronizing Device. In that patent means are shown and described for closely maintaining synchronism between the stations of a facsimile system. The present invention provides an arrangement for phasing one of the stations without sacrifice of the closely maintained synchronisms when it is desired.

It has been found that for high speed facsimile synchronizing, the electromagnetic brake system disclosed in Patent No. 2,383,360 gives the most accurate control of speed. However, it has likewise been found that the "lock-in" of this synchronizing system is so rigid that it cannot be disturbed readily by the usual means employed for phasing the recorder scanner to the transmitting scanner. The system disclosed and claimed herein was devised to overcome this rigidity of lock-in, when desired, and to cause the recorder to slip with respect to the scanner signals until a true phase position is reached, and then re-establish synchronism with the transmitter to maintain this position.

Referring now to the single figure of the drawing, there is shown diagrammatically the essential parts of a receiving station of the type shown by way of example in the patent referred to above. When the equipment is operated to receive a facsimile signal and produce a record therefrom it will be understood that reception may be had from any type of transmitting equipment which is capable of producing phasing signals when the receiving equipment is to be phased. A suitable transmitter is disclosed in Patent No. 2,326,740 granted to the present inventor on August 17, 1943, and entitled Broadcast Facsimile Transmission. Suitable transmitting and recording scanners, which are by now well known in the art, may be employed since the invention is not directly concerned with the details of image signal generation or reception. Suitable arrangements for generating and receiving an image signal are disclosed in United States Patent No. 2,257,282, granted to J. E. Smith et al. on September 30, 1941, as well as in Patent No. 2,326,740 referred to above.

It will be assumed that the apparatus shown in the drawing is to be placed in operation as a receiving station in preparation for recording image signals. As stated above since the facsimile apparatus, per se, does not form part of the present invention, it is shown only fragmentarily and diagrammatically and comprises a variable speed driving motor 10, such as an induction motor, which drives the mechanical parts of a recorder and/or a transmitter scanner of any desired type, indicated generally by reference character 12, through a drive shaft 14. The scanner is shown, by way of example, as comprising a helix drum 15 and a printer bar 16. The incoming image signal is shown illustratively as being applied to the bar 16 by way of a connection 18. Suitable amplifying and demodulating equipment will of course be employed.

Connected to the shaft 14 of the motor 10 is a tone wheel 26 which is provided with teeth so that as the tone wheel revolves, the teeth pass through the magnetic field of a magnet 28, thereby producing an alternating voltage in a coil 29 surrounding a portion of the magnetic circuit of the magnet. It will be understood that the tone wheel 26 may be geared to the motor shaft or mechanically connected in any suitable manner to a moving part of the scanner 12.

An induction motor 33 is coupled to or otherwise operatively associated with the motor shaft 14 and serves as a magnetic brake to retard the driving motor 10. The action of the induction motor 33 with variations in phase of the synchronizing tone and the tone generated by the tone wheel 26 will be fully discussed hereinafter.

It will be appreciated that the passage of the teeth on the tone wheel 26 through the magnetic field in the neighborhood of the magnet 28 will produce an alternating voltage $e_1$ in the coil 29.

The incoming synchronizing tone or signal appears across the terminals 34 and 35. This incoming tone usually is separated from a received facsimile signal in any one of a number of well known ways. Examples appear in the patents mentioned above. The incoming tone applied across the terminals 35 and 34 is not used directly for comparison purposes as in Patent No. 2,383,360 referred to above but is employed to control the frequency of an oscillator 38 of the R.-C. type disclosed in an application of the present inventor for Letters Patent of the United States entitled Resistance-Capacitance Oscillators, filed June 21, 1943, and identified by Serial No. 491,613. This type of oscillator is shown by way of example and it will be understood that other controllable oscillators may be used.

The incoming tone is applied to control the oscillator 38 through the tongue 41 and make contact 42 of a relay 43. The manner in which the relay 43 and the oscillator 38 function will be described hereinafter. The output of the oscillator 38 is coupled through a coupling condenser 46 to a limiter amplifier 48 which is part of the phase comparison system.

The oscillator 38 comprises tubes 51 and 52 having a common cathode resistor 53. The anode 54 of the tube 51 is coupled by way of a delay network to the grid 56 of the tube 52. The delay or phase shift network comprises resistors 58 and 59 and capacitors 61 and 62. The phase shift is zero in normal operation. A variable resistor 63 serves as a frequency vernier. Coupling between the tubes 51 and 52 is by way of the common cathode resistor 53 which, in effect, provides feed back from the anode 54 of the tube 51 in the correct phase relationship to its cathode. Small increments of phase shift may be obtained by adjusting the variable resistor 63. The frequency of the oscillator 38 is controlled to equal the frequency of the incoming reference frequency or tone when the relay 43 is energized so that the tone signal is applied by way of a coupling condenser 66 to the grid 68 of the tube 51. When the relay 43 is deenergized, the oscillator 38 provides a frequency which is slightly less or slightly greater than the incoming reference frequency for application to the limiter amplifier 48.

With the frequency of the generated voltage equal to the frequency of the oscillator voltage $e_2$ after amplification, it will be apparent that if the scanning apparatus shown remains in synchronism with the scanner originating the synchronizing signal applied to the terminals 34 and 35, there will be a constant phase relationship between the two waves. The relationship may be an inphase condition, or with the voltage $e_1$ leading or lagging the voltage $e_2$ by a constant angle.

The synchronizing signal $e_3$ which may be approximately sinusoidal, is passed through the limiter amplifier 48 to change the sine wave of voltage into a series of square waves. The voltage output of the coil 29, which is also substantially sinusoidal and equal in nominal frequency to the frequency of the voltage $e_2$, is applied to a limiter-amplifier 69 the output of which is a series of square waves $e_4$.

In normal operation, the frequency of the waves $e_2$ and $e_4$ is equal, but the phase relationship between them may vary momentarily. The resulting sum voltage or composite wave $e_5$ which is proportional to the instantaneous speed of the motor 10 appears across a resistor 71.

The voltage $e_5$ is amplified, if desirable or necessary, in an amplifier tube 72 of any suitable type, the output of which is impressed on a full wave rectifier 73 by way of a transformer 74. A unidirectional pulsating voltage is provided in the output circuit of the rectifier 73 across a resistor 75 the equivalent average value of which varies in amplitude with the phase relationship between the two voltages $e_4$ and $e_2$.

The unidirectional pulsating voltage appearing across the resistor 75 is amplified by a tube 76. The amplified current output of the tube 76 is applied by conductors 77 to the primary of the brake motor 33. The amplified voltage in the output of the tube 76 will be a D.-C. voltage varying in average potential in direct proportion to the phase shift. This is an ideal condition for synchronism control, and can be used in voltage control of arrangements of the kind disclosed and claimed in Patent No. 2,325,028, granted to this applicant on July 27, 1943, or to control a brake load as shown here.

The incoming signal to the apparatus shown on the drawing includes not only the image signal to be separated and applied to the terminal 18 and the reference frequency to be applied to the terminals 34 and 35, but, also, a phasing or framing pulse as set forth in Patent No. 2,326,740 referred to above. The phasing pulse is separated from the image signals and the reference frequency signals by suitable means such as tuned transformer 78. The incoming composite signal from the transmitter is applied to the terminals 79 of the transformer primary. The transformer secondary 81 is connected to the anodes 82 and 83 of a pair of diodes 84 and 85 so as to obtain full wave rectification. The rectified output from the diodes appears across a load resistor 86 and is applied in the positive sense to the grid 87 of a tube 88.

The tube 88 has both cathode and plate resistors 89 and 90, and its grid bias is set by the values of voltage divider resistors 91 and 92.

The shaft 93 of the recorder helix drum 15 is provided with a commutator 96 of insulating material. A conductive bar 98 serves to bridge two contacts 99 and 100 once for each revolution of the shaft 93. The time of closure of the circuit including the contacts 99 and 100 is slightly longer than the duration of the phasing pulse signal. The commutator circuit is connected to the cathode 103 of the tube 88 and to the grid 104 of a tube 106. A grid resistor 108 is included in the grid circuit.

The plate circuit of the tube 106 passes through the coil of the relay 43 from a suitable source of positive high potential (not shown) which may be connected from a terminal 109 through a resistor 110 and a voltage regulator tube 111 to ground as shown. The grid bias on the grid 87 of the tube 88 is set so that the cathode to ground voltage of this tube will be less than the regulated B voltage across the regulator tube 111 when no phase pulse signal appears across the resistor 86. When a phase pulse signal appears across the resistor 86, the voltage across the cathode resistor 89 will be pulsed somewhat higher than the voltage across the regulator tube. Bleeder resistors 116 and 117 are so adjusted in value that the voltage across the resistor 117 will be slightly higher than the voltage across the regulator tube 111 with no signal applied to the tube 88, and pulsed to something less than this value when a signal pulse is applied to this tube.

A second relay tongue 118 engages a break contact 121 when the relay 43 is deenergized. The contact 121 is connected through a resistor 123 to one terminal of a condenser 126. A resistor 128 is connected from the resistor 123 to the +B terminal 109.

If the tube 106 is drawing current in its initial condition, the relay 43 will be in the energized or operated condition and the tongue 118 and break contact 121 will remove the ground on the resistor 123. Then the combination paths to the grid 104 of the tube 106 will apply to this grid a potential slightly higher than that across the tube 111, or in other words, the grid 104 will be slightly positive with respect to the cathode of this same tube 106. One of the combination paths referred to includes the resistors 128, 129 and a resistor 131. Another path includes resistors 123, 129 and 131. When signals are received with the commutator 96 open, they will be negative with respect to this initial grid 104 potential.

Now if the receiving scanner is out of phase with the transmitting scanner, the scanner phase signals will be received when the commutator 96 is open, and the signals from the plate of the tube 88 and the resistors 116 and 117 will be negative with respect to the initial grid potential of tube 106. Thus the tube 106 will be pulsed negative towards plate current cutoff, and the relay 43 released to the out of phase position. When 43 is released, the control tone circuit to the oscillator 38 is opened and the oscillator drifts with respect to the control tone. At the same time the resistor 123 is grounded by the relay contacts 118 and 121 and a new bias condition of below cutoff bias is established on the grid 104. Thus the tube 106 is held to no plate current, and the relay 43 held in the out of phase condition.

As the recorder drifts with the oscillator, a position will be reached where the phase signals arrive when the commutator is closed showing that the recorder has reached an inphase condition. Phase signals from the tube 88 will now be delivered from its cathode rather than from the plate, and will be positive with respect to the cutoff bias applied to the grid 104. These inphase signals, therefore, pulse the grid 104 positive, and the tube 106 will draw plate current to operate the relay 43. This closes the control tone circuit to the oscillator re-establishing synchronism, and at the same time opens the contacts 118 and 121 to shift the bias on grid 104 in a positive direction. Sufficient positive bias is thus applied to make the tube 106 hold sufficient plate current to maintain the relay 43 in the inphase position.

The capacitor 126 develops a charge equal to the average voltage on the resistor 129. This charge is applied through the resistors 128 and 131 when the relay 43 is in the inphase position and is applied through the resistors 123 and 131 when the relay is in the out-of-phase position.

The opening or closing of the contacts 118 and 121, therefore, reversed the polarity of charge on the condenser 126 and caused it to carry the grid 104 either very far positive or very far negative in transferring between the two conditions. Thus the signals to the grid 104 are reinforced by the condenser charge by reason of operation of the relay contacts.

The chief advantage of this is that the relay contacts are set very light so that any slight change in coil current will flutter these contacts sufficiently to cause the relay to be carried through the complete operation in the direction in which its operation was started.

To review briefly the operation of the system, the image signals are separated from the received composite signals and are applied to the terminal 18 which is in communication with the printer bar 16. Sync signals are separated and are applied to the terminals 34 and 35. The composite signal is applied to the terminals 79 of the secondary of the transformer 78. When the recorder is operating in phase and also in synchronism with the more or less remote transmitter, the commutator shorting bar 98 will close the commutator circuit through contacts 99 and 100 during the time when the phasing signal appears across the load resistor 86 of the full wave rectifier or demodulator comprising the diodes 84 and 85. So long as commutator closure and receipt of the phasing signal coincides, the grid 104 of the tube 106 is maintained positive and the relay 43 is energized. The incoming reference frequency applied at the terminals 34 and 35 maintains the oscillator 38 in step with these incoming signals.

As the correct phase position of the shaft 93 occurs when the commutator is closed and while the phasing signal is being received, any signal received when the commutator 96 is open shows that the recorder is out of phase. When this set of conditions occurs, the relay 43 immediately opens to allow drift of the frequency of the oscillator 38. This drift continues until a phasing signal is received when the commutator is closed indicating a correct phase. The first signal arriving under these conditions closes the relay 43 to establish correct frequency for synchronizing and immediately stops the drift of the oscillator 38 to hold this phase position. More in detail, when the recorder is out of phase, the grid 104 of the tube 106 will be driven negative, opening the relay 43. This latter action is assisted by the condenser 126 as explained above. The tongue and contact 41 and 42 of the relay will open permitting the oscillator frequency 38 to depart or drift from the established frequency, and the speed of rotation of the shaft 14 will follow this drift until an angular position of the shaft 93 is reached when receipt of a phase pulse signal coincides with closure of the commutator circuit.

Solely by way of example, with 250 volts, positive, applied to the terminal 109 and with a type VR 105 regulator tube used as the tube 111, the voltage $e_g$ at a point 136 in the circuit with the relay contacts 118 and 121 open will be in the neighborhood of 108 volts with respect to ground. With the relay contacts closed, the voltage $e_g$ at the point 136 will be in the neighborhood of 80 to 90 volts with respect to ground. With the relay contacts 118 and 121 closed, the capacitor 126 will be charged with the point 136 as its positive terminal. This condition is indicated on the drawing. With the relay contacts open, the capacitor 126 will be charged with the point 136 as its negative terminal. The charge voltage of the capacitor will be in the neighbor hood of 30 volts in either case.

Having now described the invention, what is claimed and desired to be secured by Letters Patent is the following:

1. In a facsimile system, a scanner having a moving part to be operated co-phaseally with the moving part of another scanner, a variable speed driving motor for said moving part, a substantially constant frequency power source, means responsive to said power source to cause said motor to provide substantially constant speed, switching means operated by said motor, signal responsive means effectively in series with said switching means, a magnetic relay responsive to simultaneous closure of said switching means and operation of said signal responsive means to alter the frequency of said source.

2. In a facsimile system, a scanner having a moving part to be operated co-phaseally with the moving part of another scanner, a variable speed driving motor for said moving part, a substantially constant frequency power source means responsive to said power source to cause said motor to provide substantially constant speed, switching means operated by said motor, a thermionic tube effectively in series with said switching means, said tube having a control electrode, means to provide phasing signals on said control electrode to cause said tube to be conductive for the duration of the phasing signal, a magnetic relay responsive to simultaneous closure of said switching means and conductivity in said tube to alter the frequency of said source.

3. In a facsimile system, a scanner having a moving part to be operated co-phaseally with the moving part of another scanner, a variable speed driving motor for said moving part, a substantially constant frequency power source, means including said power source to provide substantially constant speed operation of the motor, periodically operating switch means driven from said motor, an electron tube controlled from said switch means, signal control means for said electron tube, means to provide said signal control means with phasing signals, and means responsive to a lack of co-ordination of said electron tube conductive times and said switch means to alter the frequency of said power source.

MAURICE ARTZT.

REFERENCES CITED

The following references are of record in the file of this patent:

UNITED STATES PATENTS

| Number | Name | Date |
|---|---|---|
| 2,230,820 | Young | Feb. 4, 1941 |
| 2,350,008 | Artzt | May 30, 1944 |
| 2,399,421 | Artzt | Apr. 30, 1946 |
| 2,428,946 | Somers | Oct. 14, 1947 |